(12) United States Patent
Edwards et al.

(10) Patent No.: US 6,824,860 B2
(45) Date of Patent: Nov. 30, 2004

(54) THERMOPLASTIC COMPOSITE REINFORCED THERMOFORM AND BLOW-MOLDED ARTICLE

(75) Inventors: Christopher M. Edwards, Midland, MI (US); Marc G. Gagnon, Exeter, NH (US)

(73) Assignee: AVC Holdings Inc., Midland, MI (US)

( * ) Notice: Subject to any disclaimer, the term of this patent is extended or adjusted under 35 U.S.C. 154(b) by 4 days.

(21) Appl. No.: 10/041,344

(22) Filed: Jan. 8, 2002

(65) Prior Publication Data

US 2002/0094427 A1 Jul. 18, 2002

Related U.S. Application Data

(60) Provisional application No. 60/261,927, filed on Jan. 16, 2001.

(51) Int. Cl.[7] .................................................. B32B 7/02
(52) U.S. Cl. ................. 428/218; 428/292.1; 428/297.4; 428/300.1; 428/319.3; 428/322.2
(58) Field of Search ................................ 428/174, 218, 428/285, 286, 292.1, 297.4, 300.1, 300.7, 301.4, 316.6, 319.3, 322.2, 311.11, 408

(56) References Cited

U.S. PATENT DOCUMENTS

| | | | |
|---|---|---|---|
| 4,376,834 A | 3/1983 | Goldwasser et al. | 521/159 |
| 5,055,341 A | * 10/1991 | Yamaji et al. | 428/174 |
| 5,627,254 A | 5/1997 | Oriani | 528/76 |
| 5,891,560 A | 4/1999 | Edwards et al. | 428/295 |

* cited by examiner

*Primary Examiner*—Merrick Dixon

(57) ABSTRACT

The present invention provides a reinforced thermoform or blow-molded article, and the process for preparing the same, where the reinforcement is provided by a fiber-reinforced thermoplastic composite that contains a thermoplastic resin, such as a rigid thermoplastic polyurethane, and a plurality of continuous reinforcing fibers impregnated with the resin. The reinforced thermoform blow-molded article is useful in a variety of products such as boat hulls, table tops, automotive and non-automotive seat structures, small vehicle structures such as golf carts and golf cart roofs, pallets, containers, and skis.

10 Claims, 2 Drawing Sheets

THERMOPLASTIC COMPOSITE REINFORCED THERMOFORM AND BLOW-MOLDED ARTICLE

CROSS-REFERENCE STATEMENT

This application claims the benefit of U.S. Provisional application No. 60/261,927, filed Jan. 16, 2001.

BACKGROUND OF THE INVENTION

The invention relates to thermoplastic composite reinforced thermoforms and blow-molded articles. Conventionally, plastic objects are prepared by thermoforming by the step of pulling a plastic sheet from a roll over a die or mold of the object to be formed, then sealing the sheet along the periphery of the mold. The plastic sheet is then heated to render it pliable, whereupon pressure is applied from above the sheet forcing it into the conforms of the mold. Alternatively a vacuum is drawn from below the sheet evacuating the air in the space between the mold surface and the sheet surface thereby drawing the surface of the sheet into the conforms of the mold. Additionally, pressure and vacuum can be used together to form the article.

When the heated sheet is expanded into and held against the contours of the mold and allowed to cool, the sheet retains the details of the mold upon removal. The plastic sheet is a thermoplastic material such as ABS, acrylics, polycarbonate, polyvinyl chloride, high density polyethylene, acetate, polyethylene terephthalate, polypropylene, and polystyrene. A brief survey of various thermoforming processes can be found in the background of U.S. Pat. No. 6,086,800.

It would be an advance in the art of thermoforming to prepare a thermoform that contains a reinforcing structure.

SUMMARY OF THE INVENTION

The present invention addresses a need in the art of thermoform or blow molded structures by providing a reinforced thermoplastic article comprising a) a first thermoplastic layer; and b) a fiber-reinforced thermoplastic composite that contains a thermoplastic resin and a plurality of continuous reinforcing fibers impregnated with the resin, wherein the first thermoplastic layer is thermoformed or blow-molded to the thermoplastic composite.

In a second embodiment, the present invention provides a process for preparing a reinforced thermoplastic article comprising the step of thermoforming or blow molding a first thermoplastic sheet to a fiber-reinforced thermoplastic composite that contains a thermoplastic resin and a plurality of continuous reinforcing fibers impregnated with the resin.

DETAILED DESCRIPTION OF THE INVENTION

A fiber-reinforced thermoplastic composite can greatly enhance the physical properties of a thermoform or blow-molded article. Additionally, because the composite itself can be thermoformed, reinforcement can be achieved in one step during the formation of the thermoplastic article.

A preformed thermoplastic composite skeleton can be prepared with the contours of the composite following the shape of the mold. In this case, the thermoplastic composite reinforced thermoform can be prepared by placing the composite skeleton in the mold and forming the thermoplastic sheet right onto the mold under conditions pressure and heat (plug assist) or vacuum and heat (drape forming) so that the thermoplastic sheet can adhere to and partially form around the composite skeleton, yielding a rigid thermoform upon cooling and removal from the mold.

The preformed thermoplastic structure itself can be used as the plug, alone or in combination with a mechanical plug to put the reinforcement on the inside of the thermoformed sheet. In this case, pressurized air can also be used to assist forming.

If the thermoplastic composite is not preformed, pultruded two-dimensional profiles can be clamped separately from the sheet outside the mold in areas where reinforcement is desired. The pultruded pieces are advantageously heated to forming temperature and should be of sufficient length to allow slippage through the clamps when a plug-assist or matched mold die forces both the sheet and the thermoplastic composite pultrusions into the mold cavity. The entire structure would then be held in place and cooled within the mold prior to removal.

Figure 1:
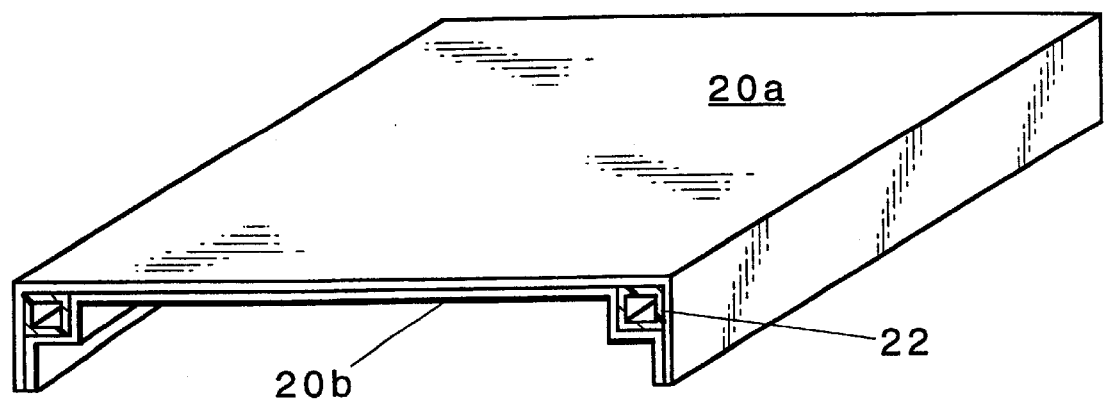
FIG. 1 is an illustration of a reinforced twin sheet thermoform.

In a twin sheet forming process, a fiber-reinforced thermoplastic composite can be placed between a first and a second thermoplastic sheet where reinforcement is desired. The sheets can then be heated and the edges sealed prior to blowing. Then, the composite can be pinched between the sealed edges and bonded to the final twin walled structure. The thermoplastic matrix of the composite thereby forms a strong bond to the sheets. FIG. 1 is an illustration of a reinforced twin sheet thermoform. In this case, the sheets form a top skin (20a) and a lower skin (20b) around the fiber-reinforced thermoplastic composite (22). Alternatively, the composite can be placed above and below the sheet so that the sheets are blown onto the reinforcement when the structure is pinched by the periphery of the mold. In this case, the sheets can form a skin inside the fiber-reinforced composite.

Thermoplastics suitable for sheet and composite materials include ABS, thermoplastic polyesters such as polyethylene terephthalate (PET), polycarbonates (PC), polyvinyl chloride (PVC), polyamides such as nylon, polysulfones, polyarylene sulfides, polyarylene ethers such as polyphenylene oxide, polyether ketones, polyetherether ketones, acetate, acrylic-polyvinyl chloride copolymer, thermoplastic polyurethane (TPU), high density polyethylene (HDPE), polypropylene, and polystyrene. In general, it is preferable that the thermoplastic sheet material be compatible with the thermoplastic composite material. As used herein, the word compatible is used to refer to polymer resins that can adhere to each other in the absence of ancillary adhesives or compatibilizers. Thus, polar resins such as ABS, PET, PVC, PC, nylon, and TPU are compatible with each other and nonpolar resins such as polypropylene, HDPE, and polystyrene are compatible with each other.

It may be desired to thermoform or blow-mold incompatible resins, in which case an ancillary adhesive layer or compatibilizing agent can be used to promote adhesion. An example of suitable compatibilizing agent is ethylene-vinyl acetate or ethylene vinyl alcohol.

When the thermoplastic sheet material is a polar resin such as ABS, a preferred thermoplastic for the composite is a depolymerizable and repolymerizable polymer containing structural units of the formula:

where Z is S or O; and Z' is S, O, or NH. More preferably, the composite thermoplastic material is a thermoplastic polyurethane or a thermoplastic polyurea. Most preferably, the composite thermoplastic material is a thermoplastic polyurethane (TPU).

The TPU may be soft or rigid and is preferably rigid. Rigid TPUs (also known as engineering thermoplastic polyurethanes or ETPUs) are characterized by having a glass transition temperature of not less than 50° C. The ETPU preferably has a hard segment content of at least 90 percent by weight, and most preferably about 100 percent by weight. The disclosure and preparation of is described, for example, by Goldwasser et al. in U.S. Pat. No. 4,376,834 and Oriani in U.S. Pat. No. 5,627,254, which teachings are incorporated herein by reference. ETPUs are commercially available under the tradename ISOPLAST™ ETPUs (a trademark of The Dow Chemical Company). Soft TPUs are characterized by having a $T_g$ of less than 25° C. and are well known in the art. Soft TPUs are commercially available under the tradename PELLETHANE™ resins (a trademark of The Dow Chemical Company).

TPUs, in general, and ETPUs in particular, partially depolymerize when heated due in part to the presence of residual polymerization catalyst. The catalyst is typically hydrolytically- and thermally-stable and is "live" in the sense that it is not inactivated once the TPU has been polymerized. This depolymerization allows the TPU to exhibit a particularly low melt viscosity, which enhances wet-out of the fibers. Upon cooling, the depolymerized polyurethane repolymerizes to reform a high molecular weight polymer.

Fiber-reinforced thermoplastic composites that are made using ETPUs are described by Edwards et al. in U.S. Pat. No. 5,891,560. The composites by Edwards et al. include a continuous phase which is advantageously a polyurethane or polyurea (or corresponding thiourethane or thiourea) impregnated with preferably at least 30 percent, more preferably at least 50 percent, and most preferably at least 65 percent by volume of reinforcing fibers (for example, glass, carbon, or aramid fibers) that extend preferably through the length of the composite. The general pultrusion process described by Edwards et al. includes the steps of pulling a fiber bundle through a preheat station, a fiber pretension unit, an impregnation unit, a consolidation unit that includes a die that shapes the composite to its finished shape, and a cooling die. The pulling is advantageously accomplished using a haul off apparatus, such as a caterpillar-type haul off machine. Additional shaping or post-forming processes can be added as needed. As described by Edwards et al., the preferred continuous phase polymer is an ETPU made by reacting in the presence of a hydrolytically and thermally stable catalyst (e.g., $Sn^{+2}$ catalyst such as dimethyltin dimercaptide) approximately stoichiometric amounts of (a) a diisocyanate, (b) a chain extender, and optionally (c) a high equivalent weight (i.e., from about 750 to about 5000 eq. wt.) diol. As used herein, a chain extender refers to a compound having preferably two isocyanate-reactive groups per molecule and a molecular weight of up to about 500, preferably up to about 200. Suitable isocyanate-reactive groups include hydroxyl, thiol, primary amine and secondary amine groups, with hydroxyl, primary and secondary amine groups being preferred and hydroxyl groups being particularly preferred. Examples of suitable chain extenders and diisocyanates are disclosed in U.S. Pat. No. 5,891,560, column 5, lines 25–51, which is incorporated herein by reference. Preferably, the high equivalent weight diol constitutes not more than 10 weight percent, preferably about 0 percent of the ETPU.

Figure 2A:
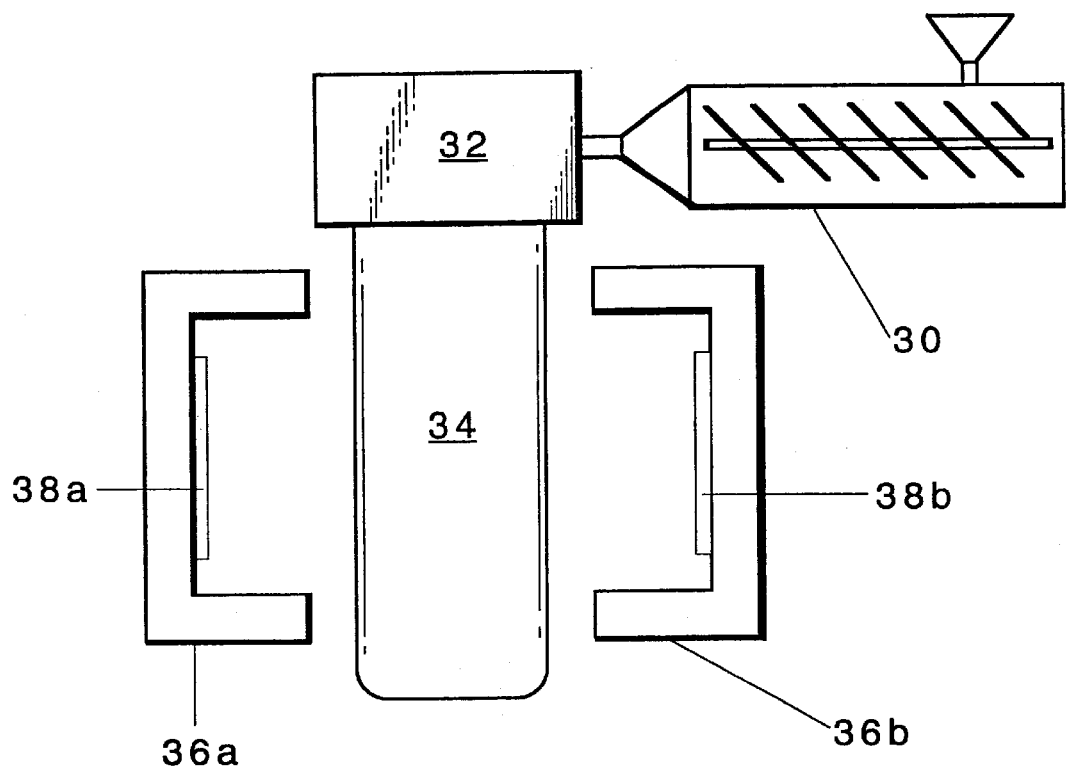
FIG. 2 is an illustration of a reinforced blow molded article.
Figure 2B:
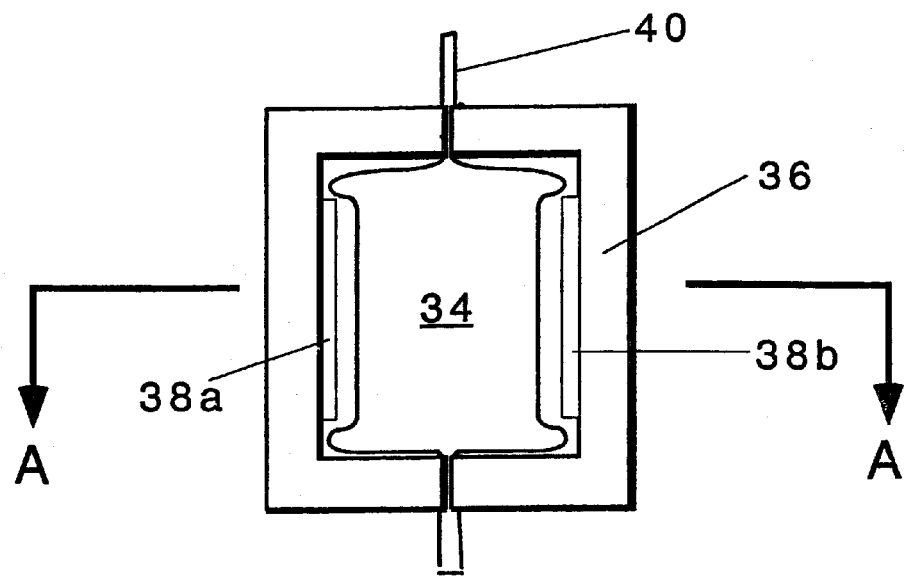
Figure 2C:
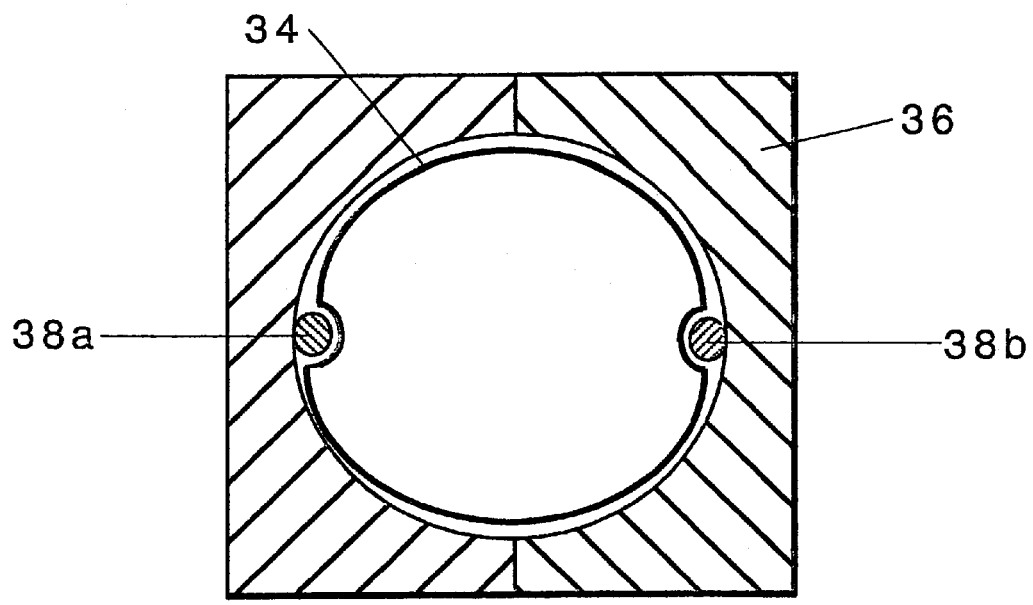

Process methodology that is similar to that used to form a reinforced thermoform can be used to create a reinforced blow-molded article. For example, as illustrated in FIG. 2B, resin material can be extruded through an extruder (30) and into a dye (32) to form a parison (34), which is an extruded tube of plastic from which articles are made by blow molding. The hot parison (34) is then extruded between two mold halves (36a and 36b), at least one of which holds and preferably both hold the fiber-reinforced thermoplastic composite (38a and 38b). The mold halves (36a and 36b) can be closed so that a portion of the the parison (34) is sealed. As shown in FIG. 2B, gas can be injected through an inlet (40) to the parison (34) causing it to take up the shape of the mold (36) and adhere to and partially surround the composite (38a and 38b). The parison is allowed to cool and the reinforced article released from the mold. FIG. 2C is a cross-section of the mold (36) and the reinforced article that is formed by blow-molding. Alternatively, the article can also be prepared by blow-molding an injection molded preform onto the composite.

The reinforced thermoform or blow-molded article is useful in a variety of products such as boat hulls, table tops, automotive and non-automotive seat structures, small vehicle structures such as golf carts and golf cart roofs, pallets, containers, and skis.

What is claimed is:

1. A reinforced thermoplastic article comprising a) a first thermoplastic layer; and b) a fiber-reinforced thermoplastic composite that contains a thermoplastic resin and a plurality of continuous reinforcing fibers impregnated with the resin, wherein the first thermoplastic layer is thermoformed or blow-molded to the thermoplastic composite.

2. The reinforced thermoplastic article of claim 1 wherein the thermoplastic resin of the composite is a depolymerizable and repolymerizable polymer containing structural units of the formula:

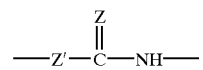

where Z is S or O; and Z' is S, O, or NH.

3. The reinforced thermoplastic article of claim 1 wherein the thermoplastic composite includes an engineering thermoplastic polyurethane having a $T_g$ of not less than 50° C.

4. The reinforced thermoplastic article of claim 1 wherein the thermoplastic composite is impregnated with at least 50 volume percent of reinforcing fibers that extend through the length of the composite.

5. The reinforced thermoplastic article of claim 1 wherein the thermoplastic layer comprises ABS, polycarbonate, polyvinyl chloride, high density polyethylene, polypropylene, polyethylene terephthalate, acetate, acrylic-polyvinyl chloride copolymer, thermoplastic polyurethane, or polystyrene.

6. The reinforced thermoplastic article of claim 1 wherein the thermoplastic resin of the composite is selected from the group consisting of polyesters, polyamides, polysulfones, polyoxymethylenes, polypropylene, polyarylene sulfides, polyphenylene oxide/polystyrene blends, polyetherether ketones, and polyetherketones.

7. The reinforced thermoplastic article of claim 1 which includes a second thermoplastic layer that is thermoformed to the thermoplastic composite to form a reinforced twin sheet thermoform.

8. The reinforced thermoplastic article of claim 7 wherein the first and second thermoplastic layers include ABS and the thermoplastic composite includes an engineering thermoplastic polyurethane having a $T_g$ of not less than 50° C.

9. The reinforced thermoplastic article of claim 1 which further includes an adhesive layer between the first thermoplastic layer and the thermoplastic composite.

10. The reinforced thermoplastic article of claim 1 which is in the shape of a boat hull, a table top, an automotive seat structure, a non-automotive seat structure, a golf cart roof, a pallet, or skis.

* * * * *